Aug. 31, 1965         J. R. SPENCER         3,204,080
ELECTRICAL CLEANING APPARATUS
Filed June 3, 1963
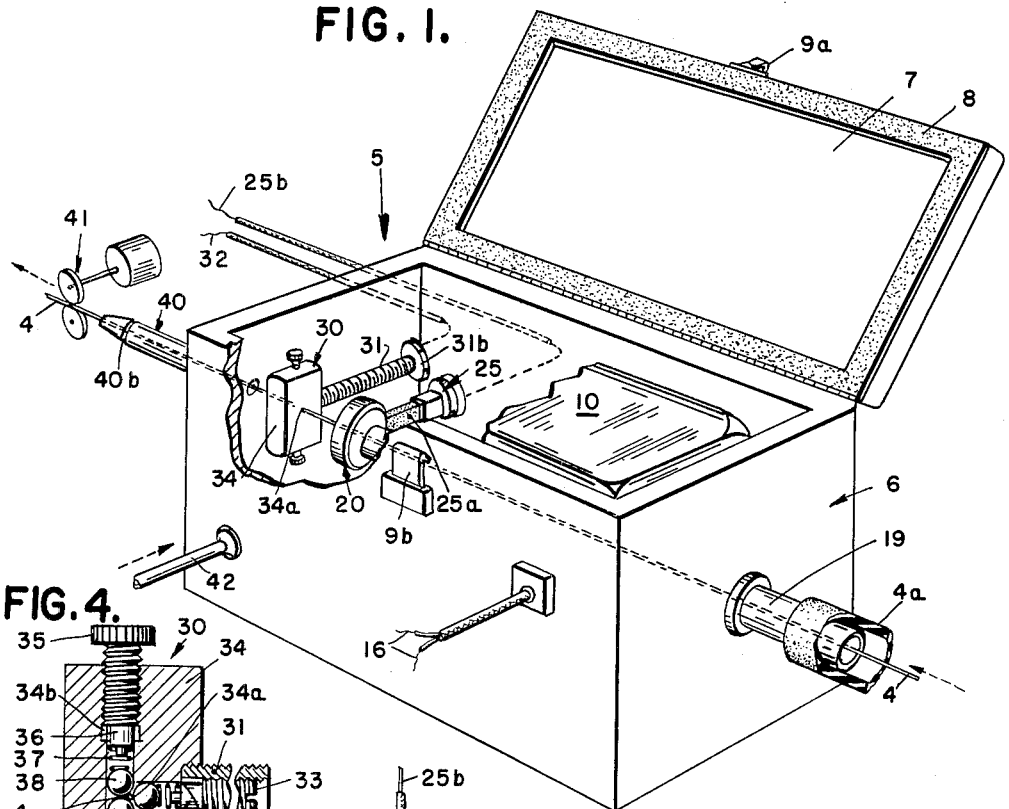
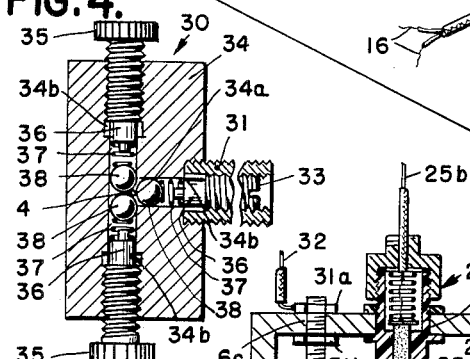
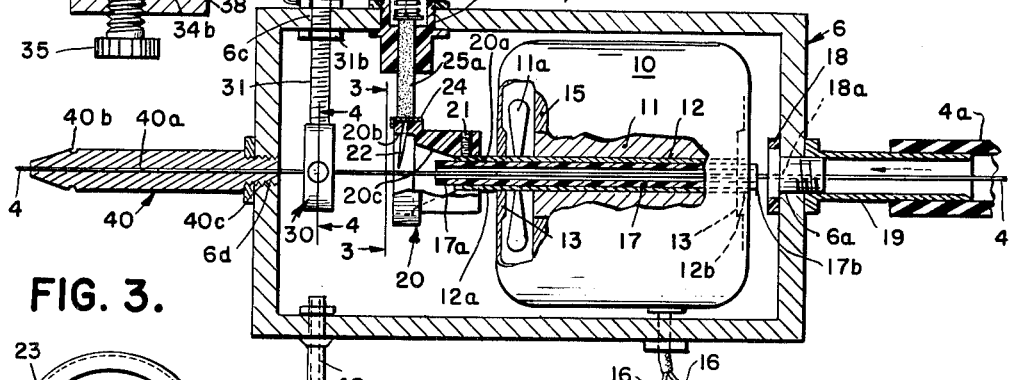
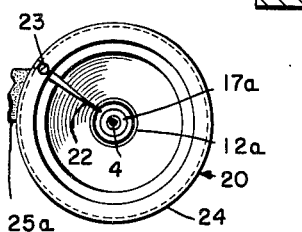
INVENTOR.
JAMES R. SPENCER
BY
George C. Sullivan
Agent United States Patent Office 3,204,080
Patented Aug. 31, 1965

3,204,080
ELECTRICAL CLEANING APPARATUS
James R. Spencer, Cartersville, Ga., assignor to Lockheed Aircraft Corporation, Burbank, Calif.
Filed June 3, 1963, Ser. No. 285,019
7 Claims. (Cl. 219—121)

This invention relates to apparatus for the cleaning of an object, and more particularly to the electrical cleaning of weld filler wire.

Rolls of continuous weld filler wire are widely used in welding applications and one major problem encountered in the use of such wire is that of contamination of the wire by oxidation, moisture, dust, grease, and also air entrapment in the pores of the weld filler wire during storage of the wire prior to its use. Any form of contamination introduced into a weld is generally detrimental to weld quality; and to insure quality welding, this invention provides for the positive electrical cleaning of weld filler wire preferably immediately prior to the use thereof.

Accordingly, it is an object of this invention to provide for the positive electrical cleaning of an object by moving an electric arc relative thereto.

It is another object of this invention to provide a device for the electrical cleaning of weld filler wire in an inert atmosphere.

A further object of this invention is to provide apparatus for the cleaning of weld filler wire by rotating an arc about the weld filler wire.

A still further object of this invention is to provide an electrical contact in engagement with a wire which will not scar the wire when the wire is moved relative thereto.

Other objects and advantages will become apparent from the following description taken in connection with the accompanying drawings in which:

FIGURE 1 is a perspective view of an electrical cleaning apparatus constructed in accordance with this invention with certain portions broken away for the sake of clarity;

FIGURE 2 is a top view partially in section of the electrical cleaning apparatus of FIGURE 1;

FIGURE 3 is an end view of the electrode cup holder for the electrical cleaning apparatus taken along line 3—3 of FIGURE 2; and FIGURE 4 is a cross-sectional side view of the contact body assembly for the electrical cleaning apparatus taken along line 4—4 of FIGURE 2.

Generally stated, this invention comprises apparatus and method for the electrical cleaning of weld filler wire to remove contaminants therefrom by rotating an electric arc about the weld filler wire as the weld filler wire moves in the axial direction with respect thereto. The weld filler wire is longitudinally moved in spaced-apart relation with respect to the electrode, which rotates about the weld filler wire, and through a contact assembly for connecting the weld filler wire to ground. High frequency electric current is supplied to the rotating electrode, which jumps the gap between the electrode and the weld filler wire as the wire moves past the electrode and in so doing removes contaminants from the weld filler wire. The cleaning apparatus is preferably enclosed in an inert gas atmosphere to prevent contact of the wire with contaminants during the cleaning process.

More specifically, there is shown in FIGURES 1 and 2, for cleaning the electrical weld filler wire 4, the wire cleaning apparatus 5 comprising a container 6 having a top closure 7 provided with the soft rubber gasket seal 8. For closing the container 6 with the gasket seal 8 in sealing engagement with the top end walls of the body of container 6, a latch assembly 9a, 9b is provided.

Mounted within container 6 is an electric motor 10 having a central rotor 11 fixedly connected to a hollow shaft 12, which is mounted adjacent its opposite ends 12a and 12b on bearings 13. A stator 15 is mounted in surrounding relation to the rotor 11 and electrical leads 16 are provided for connecting the motor 10 to a source of power. For cooling the motor 10, a fan blade 11a is connected to the motor shaft 11 for rotation therewith. Insulating sleeve 17, made of a suitable insulating material such as ceramic, is mounted within the hollow shaft 12 such that its opposite ends 17a and 17b extend outwardly from the opposite ends of the shaft 12. A bolt 18, preferably made of insulating material such as nylon, having a bore 18a therethrough is mounted in a hole 6a formed in container 6 and is threadably secured to an enlarged protective mounting or guide sleeve 19 exterior of the container 6.

A hollow electrode holder or cup 20, best seen in FIGURES 2 and 3, also made of a suitable insulating material such as nylon, is mounted on the end 12a of shaft 12. Cup 20 comprises a first bore 20a at its one end and an enlarged bore 20b at its other end which bores are interconnected by a frustro conical interior side wall surface 20c. The cup 20 is mounted on the shaft 12 with the shaft end 12a fitting into the bore 20a. For preventing relative rotation between the shaft 12 and the cup 20, a radially directed set screw 21 locks the cup 20 to the shaft 12. A preferably tungsten electrode 22, which is held in place by a set screw 23, is mounted in the large end of cup 20 such that it radially extends toward the center line of the cup 20 proximate the end of the cup removed from shaft 12.

An annular conductive copper ring 24 is secured to the peripheral surface of cup 20 in surrounding relation to and in electrical contact with electrode 22. For connecting electrode 22 to a source of power, an electrode brush assembly 25 is secured in hole 6b formed in container 6 such that the spring biased electrode brush 25a thereof, which is connected to electrical lead 25b, is normally biased into engagement with the conductive ring 24.

For connecting weld filler wire 4 to ground, there is provided a contact assembly 30, best seen in FIGURE 4, which is supported from container 6. Contact assembly 30 comprises an interiorly and exteriorly threaded sleeve 31 fitting through a hole 6c in container 6 having lock nuts 31a and 31b threadably mounted in engagement with the opposite sides of the container wall in sealing relation to hole 6c. The nut 31a is secured to a ground wire 32 and a threaded bolt 33 is threadably engaged with the interior screw threads of sleeve 31. Contact assembly body 34 is secured on the extending end of bolt 31 and comprises a first bore 34a in axial alignment with the hollow motor shaft 12 and three bores 34b in a plane normal to said first bore which intersect at a common point with the bore 34a. An axially adjustable set screw 35, a plunger 36, a spring 37, and a ball bearing or contact 38 are mounted in each of bores 34b such that the ball bearings are resiliently biased into engagement with weld filler wire 4 passing through the transverse bore 34a.

An extension 40 having a bore 40a therethrough, a locking groove 40b, and a reduced threaded end 40c is secured by its threaded end to a threaded hole 6d exteriorly of container 6 in axial alignment with the bore 34a. For pulling the wire 4 through the electrical cleaning apparatus 5, any type of a suitable wire feed device 41 may be employed. To complete the electrical cleaning apparatus 5, a fluid line 42 connected to a suitable source of inert gas is connected to the container 6.

In operation, the cleaning apparatus 5 may, for example, be mounted on an automatic welding machine, not shown, with the extension 40 received in and locked with respect to a wire feed device such as the schematically shown wire feed device 41. The apparatus 5, so installed, may then be supplied weld filler wire through a casing 4a, which is mounted on the sleeve 19, from an enclosed wire reel, not shown. The weld filler wire is threaded through sleeve 19, insulating sleeve 17, within hollow motor shaft 12, through transverse bore 34a in contact assembly body 34, and out through extension 40 into engagement with the wire feed device. Thereupon the cover 7 is locked in place and inert gas under a positive pressure is supplied to the container through fluid line 42. The inert gas leaks out of the container 6 along the space between the weld filler wire 4 and the bores 40a and 18a in extensions 40 and bolt 18, respectively and in so doing, purges the container.

To start the cleaning apparatus 5, the motor 10 is connected to a conventional power source by leads 16, and the electrode brush assembly 25 is connected to a high frequency power source by lead 25b. These electrical connections may be made manually or automatically by appropriate switching mechanisms upon actuation of the wire feed device, is desired. In the cleaning operation, the weld filler wire 4 is moved through the cleaning apparatus by the wire feed device 41 and the electrode cup 20 revolves rapidly about the weld filler wire 4 because of its direct connection to the hollow shaft 12 of the motor 10. An arc jumps the gap between the electrode 22 and the weld filler wire 4, and in so doing, knocks oxidized material, dust, grease, and other contaminants off the wire thereby cleaning the wires at substantially the point of impingement of the arc on the weld filler wire. Accordingly, to insure cleaning of the entire surface area of the weld filler wire, the electrode 22 is rotated with respect to or about the weld filler wire as the weld filler wire passes the arc at a rate of speed relative to the rate of axial movement of the weld filler wire by wire feed device 41 such that the electric arc operates or impinges upon substantially the entire surface of the weld filler wire. It should be noted that the insulating sleeve 17 prevents current from traveling along the weld filler wire 4 and getting into the motor where it could burn up the motor. It should also be noted that the contact assembly body 34 provides a positive electrical connection between the weld filler wire 4 and ground because of the spring biased contacts 38 being in continuous engagement therewith. The principal advantage obtained by the use of the contact assembly body 34 is that positive electrical contact is maintained while at the same time burring or scarring of the electrode filler wire is prevented because of the resilient and rolling engagement of the contacts 38 with the wire.

It will be seen from the above that this invention provides an electric cleaning apparatus which positively cleans weld filler wire as the wire is moved through a rapidly rotating arc. The arc is rotated at a rate relative to the rate of axial movement of the wire to assure impingement of the arc on substantially the entire surface area of the wire to obtain complete cleaning of the wire. Although a rotating arc is shown, it is to be expressly understood that the invention is not limited thereto but also contemplates any other type of movement of the arc relative to the wire, such as oscillatory movement. Also, it should be noted that while the invention has particular utility in the cleaning of weld filler wire, it is within the scope of this invention that plate stock, for example, could be moved relative to one or more electrodes mounted for rapid movement relative to the plate stock at a fixed distance above the surface thereof. Also, it is to be understood that the resiliently biased contacts 38 which provide a positive electrical connection between the weld filler wire and the ground without scarring the weld filler wire, could be used in other applications, as for example in a welding torch nozzle to supply electric current to the weld filler wire moving through the nozzle.

While a particular embodiment of the invention has been illustrated and described, it will be obvious to those skilled in the art that various changes and modifications may be made without departing from the invention, and it is intended to cover in the appended claims all such modifications and equivalents as fall within the true spirit and scope of this invention.

What is claimed is:

1. An electrical cleaning apparatus for cleaning a length of weld filler wire passing therethrough comprising:
    an electric motor having a central rotor mounted on a hollow shaft;
    a hollow electrode cup holder mounted on one end of said shaft in concentric relation with respect to said shaft;
    an electrode mounted in said cup in spaced-apart relation from the end of said shaft and extending radially inwardly toward the axial center line of said shaft;
    electric circuit means for connecting said electrode to a source of high frequency power;
    and a contact assembly including at least one electrical contact element adapted for resilient biasing engagement with weld filler wire passing through the cleaning apparatus for electrically grounding the weld filler wire to electrical ground.

2. The electrical cleaning apparatus of claim 1 wherein said contact element is a spring biased roller element.

3. An electrical cleaning apparatus for cleaning a length of wire, comprising:
    a hollow shaft member through which a length of wire to be cleaned can be passed,
        said hollow shaft member being mounted for rotation;
    means connected to said hollow shaft member for imparting rotation thereto;
    an electrode holding means mounted on an end of said hollow shaft member for rotation therewith;
    at least one electrode mounted in said electrode holding means,
        said electrode being in spaced apart relationship from said end of said hollow shaft member and extending inwardly toward the axial centerline of said hollow shaft member;
    electric circuit means for connecting said electrode to a source of electrical energy; and
    contact means disposed adjacent the path of travel of the length of wire being cleaned,
        said contact means including a member mounted for resiliently biased contact with a portion of the length of wire so that there can be established an electric circuit comprising said electrode, at least a portion of the length of wire being cleaned, and an electric arc established between said electrode and the wire.

4. An electrical cleaning apparatus for cleaning a length of wire, comprising:
    an enclosure;
    a hollow member through which a length of wire to be cleaned can be passed,
        said hollow member being supported for rotation and having an end thereof disposed within said enclosure;
    means connected to said hollow member for imparting rotation thereto;
    an electrode holding means mounted on said end of said hollow member for rotation therewith;
    at least one electrode mounted in said electrode holding means,
        said electrode being in spaced apart relationship from said end of said hollow member and extending inwardly toward the axial centerline of said hollow member;
    electric circuit means for connecting said electrode to a source of electrical energy; and
    contact means disposed adjacent the path of travel of the length of wire being cleaned,
        said contact means including a member mounted for resiliently biased contact with a portion of the length of wire so that there can be established an electric circuit comprising said electrode, at least a portion of the length of wire being cleaned, and an electric arc established between said electrode and the wire.

5. Apparatus as in claim 4, wherein:
said contact means is disposed within said enclosure.

6. An electrical cleaning apparatus for cleaning a length of wire, comprising:
 a hollow shaft member through which a length of wire to be cleaned can be passed,
  said hollow shaft member being mounted for rotation;
 means connected to said hollow shaft member for imparting rotation thereto;
 an electrode holding means mounted on said hollow shaft member for rotation therewith;
 at least one electrode mounted in said electrode holding means,
  said electrode being in spaced apart relationship from said hollow shaft member and extending inwardly toward the axial centerline of said hollow shaft member;
 electric circuit means for connecting said electrode to a source of electrical energy; and
 contact means disposed adjacent the path of travel of the length of wire being cleaned,
  said contact means including a member mounted for resiliently biased contact with a portion of the length of wire so that there can be established an electric circuit comprising said electrode, at least a portion of the length of wire being cleaned, and an electric arc established between said electrode and the wire.

7. An electrical cleaning apparatus for cleaning a length of wire, comprising:
 an enclosure;
 a hollow member through which a length of wire to be cleaned can be passed,
  said hollow member being supported for rotation and having at least a portion thereof disposed within said enclosure;
 means connected to said hollow member for imparting rotation thereto;
 an electrode mounting means mounted on said portion of said hollow member for rotation therewith;
 at least one electrode mounted in said electrode holding means,
  said electrode being in spaced apart relationship from said hollow member and extending inwardly toward the axial centerline of said hollow member;
 electric circuit means for connecting said electrode to a source of electrical energy; and
 contact means disposed adjacent the path of travel of the length of wire being cleaned,
  said contact means including a member mounted for resiliently biased contact with a portion of the length of wire so that there can be established an electric circuit comprising said electrode, at least a portion of the length of wire being cleaned, and an electric arc established between said electrode and the wire.

References Cited by the Examiner

UNITED STATES PATENTS

| | | | |
|---|---|---|---|
| 808,186 | 12/05 | Benjamin | 219—123 |
| 2,125,172 | 7/38 | Kinzel | 219—121 X |
| 2,472,851 | 6/49 | Landis et al. | 219—123 X |
| 3,142,746 | 7/64 | Schmerling | 219—130 |
| 3,146,336 | 8/64 | Whitacre | 219—121 |
| 3,165,662 | 1/65 | Norris | 219—136 X |

RICHARD M. WOOD, *Primary Examiner.*

JOSEPH V. TRUHE, *Examiner.*